United States Patent
Clark et al.

(10) Patent No.: US 11,744,268 B2
(45) Date of Patent: Sep. 5, 2023

(54) HIGH COMPLETE PROTEIN, CHEMICAL FREE ENERGY ENHANCEMENT AND MUSCLE REJUVENATION BEVERAGE FOR REFRESHMENT MEAL REPLACEMENT AND ENHANCED ANTI-INFLAMMATORY RESPONSE

(71) Applicants: George H. Clark, Statesville, NC (US); Mary Ann Clark, Statesville, NC (US)

(72) Inventors: George H. Clark, Statesville, NC (US); Mary Ann Clark, Statesville, NC (US)

( * ) Notice: Subject to any disclaimer, the term of this patent is extended or adjusted under 35 U.S.C. 154(b) by 564 days.

(21) Appl. No.: 16/857,819

(22) Filed: Apr. 24, 2020

(65) Prior Publication Data

US 2020/0337340 A1    Oct. 29, 2020

Related U.S. Application Data

(60) Provisional application No. 62/920,317, filed on Apr. 24, 2019.

(51) Int. Cl.
| | | |
|---|---|---|
| *A23L 2/66* | (2006.01) | |
| *A23L 2/60* | (2006.01) | |
| *A23C 9/156* | (2006.01) | |
| *A23L 2/56* | (2006.01) | |

(52) U.S. Cl.
CPC ............. *A23L 2/66* (2013.01); *A23C 9/1565* (2013.01); *A23L 2/56* (2013.01); *A23L 2/60* (2013.01); *A23V 2002/00* (2013.01)

(58) Field of Classification Search
CPC ........... A23L 2/66; A23L 2/56; A23C 9/1565; A23V 2002/00
USPC .......... 426/66, 426, 491, 492, 648, 656, 657
See application file for complete search history.

(56) References Cited

U.S. PATENT DOCUMENTS

2015/0133552 A1 *   5/2015   Hans et al.

OTHER PUBLICATIONS

"Reverse Osmosis for the Food and Beverage Industry"., https://fctwater.com/reverse-osmosis-for-food-and-bevera . . . pp. 1-4 (Year: 2022).*

Flikser, R., What is Ultra-filtered Milk, and Fairlife milk promises increased protein, calcium, decreased sugar, and no lactose. What is Ultra-filtered Milk and should you bother . . . MyRecipes.pdf-Adobe Actrobat Pro Dc. pp. 1-4 (Year: 2018).*

* cited by examiner

*Primary Examiner* — Helen F Heggestad
(74) *Attorney, Agent, or Firm* — LORUSSO & ASSOCIATES

(57) ABSTRACT

A beverage composition made with low-calorie, lactose-free skim milk in liquid or dry powder form. Amelanchier alnifolia extract having Abscisic Acid is added to the skim milk in a multi-step process that utilizes $CO_2$ to maintain the nutrient value of the extract. Crystalline fructose, natural flavorings, nutrients and carbonation are added to produce a flavorful beverage composition. A method to make a carbonated beverage composition with low-calorie, lactose-free skim milk and Amelanchier alnifolia extract includes a series of steps to preserve the nutrient value of the extract.

4 Claims, No Drawings

HIGH COMPLETE PROTEIN, CHEMICAL FREE ENERGY ENHANCEMENT AND MUSCLE REJUVENATION BEVERAGE FOR REFRESHMENT MEAL REPLACEMENT AND ENHANCED ANTI-INFLAMMATORY RESPONSE

CROSS-REFERENCE TO RELATED APPLICATIONS

This regular utility application claims the benefit of U.S. Provisional Application Ser. No. 62/920,317, filed Apr. 24, 2019, the contents of which are incorporated herein by reference.

FIELD OF THE INVENTION

This disclosure relates generally to beverage formulations. More particularly, this disclosure relates to high-protein beverages for energy enhancement, muscle rejuvenation and anti-inflammation.

BACKGROUND OF THE DISCLOSURE

The increasing consumption of classic caffeinated, chemically-enriched energy drinks worldwide by children, adolescents and adults in all states of physical condition is well known. In recent years, however, there have appeared in the literature documented reports of serious cardiovascular events, respiratory disorders, seizures, psychotic episodes and even death due to the continued consumption of caffeinated, chemically enhanced energy drinks by children, adolescents and adults who may suffer from undiagnosed heart disease.

It is well known that physical conditioning is essential to participate in physical sports or in the efficient discharge of normal everyday activities. Consumers of all ages are drinking commercially prepared beverages which are supplemented with caffeine, taurine, guarana and other ingredients advertised to give consumers increased energy to exercise, play sports or just conduct the strenuous activities of an active lifestyle. These drinks all have low protein and nutrient quality. Many reports have shown that these commercial beverages to be harmful to various individuals in a general worldwide population that labors under various conditions of health stress.

We know of no relevant art that discloses any caffeine or chemical-additive-free nutritional beverage that contains high levels of complete protein, antioxidants, anti-inflammation and enhancement of all the essential qualitative nutrients found in low-calorie, Lactose-free Skim milk combined with the nutrition of Coconut water and further combined with the nutrition of Amelanchier alnifolia. The berry provides natural energy enhancement, nutrition supplementation, antioxidant activity and Abscisic Acid to aid in the increase of the immune response, which is not experienced from consuming the current commercially-produced, caffeinated, chemically-enhanced beverages reported to be dangerous for consumption by certain health-compromised adults as well as adolescents and children.

Another persistent problem with respect to milk-based beverages is the presence of bacteria such as coliform, an enteric variety. Pasteurization has been, until now, the standard method used to eliminate, or at least minimize the development of bacterial colonies so as to extend the useable shelf life of agricultural-based beverages. Pasteurization, in its simplest form, involves the application of heat to a substance for a specified time to destroy potentially harmful microorganisms. Variations on the standard pasteurization method have been developed to further extend the shelf life of viable products.

One such variation is known as HTST (high temperature, short time) pasteurization that utilizes temperatures of 165° F. to about 168° F. and time periods from about 2 seconds to about 30 seconds. Exposure time is inversely proportional to the temperature used. A second variation is VAT pasteurization that utilizes temperatures from about 172° F. up to about 175° F. for a time period of 30 minutes.

A yet further variation, UHT (ultra-high temperature) pasteurization, utilizes temperatures in excess of 215° F. for about 2 to 5 seconds. UHT pasteurization is often used to extend the shelf life of chocolate-flavored milk drinks from 14 days under refrigeration with standard heat pasteurization to up to 90 days under refrigeration and is the method typically used when milk or juice drinks are to be kept refrigerated on store shelves for over 21 days. Whether standard or UHT pasteurization is used, stabilizers and preservatives are usually added to provide a stable product.

What is needed and what we have invented is an all-natural, preservative-free, caffeine and chemical-additive-free, high-complete protein-enriched energy-enhancement beverage that provides nutritionally all of the qualitative nutrients found in low-calorie, Lactose-free Skim milk plus Coconut water and Anti-oxidant activity of Abscisic Acid Immune response increase provided by Amelanchier alnifolia. As used herein, "high-complete protein" means a protein source that supplies at least the nine amino acids not created by the human body also commonly known as the 9 essential amino acids. As further used herein, "low-calorie" means a version of a food or beverage of a specified serving size has a lower calorie content than the calorie content of a standard version of the same food or beverage with the same specified serving size.

SUMMARY OF THE DISCLOSURE

In one aspect of the disclosure, the beverage provides natural long-term energy enhancement, muscle rejuvenation and essential nutritional supplementation to the consumer who wishes to lead an active lifestyle. This inventive beverage will also participate in a regimen of weight control and may be used as a meal replacement beverage and will enhance immune response activity when needed by the body. The beverage provides a rapidly and highly absorbable source of calcium, magnesium and potassium to the human boy without gastric upset and stomach bloating and thus provides an ideal composition for consumption by individuals who are "AT RISK" of developing bone diseases such as osteoporosis or osteomalacia.

The beverage composition is designed to improve cognitive performance after physical exercise or in times of mental stress. In addition, the disclosed beverage composition provides muscle rejuvenation after physical stress which is not a benefit of the aforementioned caffeinated and chemically-enhanced energy drinks. The beverage composition provides high-complete protein as well as all of the qualitative nutrients of low-calorie, Lactose-free Skim milk plus the nutrition of Coconut water with the added anti-oxidant activity of Abscisic Acid and the nutrition of Amelanchier alnifolia extract without the use of added caffeine, taurine, guarana or other chemicals.

In a further aspect of the disclosure, carbon dioxide infusion is used during the processing of the disclosed beverage to suppress the growth of bacterial colonies and prevent degradation of flavors and nutrients. Carbon dioxide infusion further enhances low sugar sweetness and taste while mouthfeel can be reduced without the need for gel binders, stabilizers or chemical preservatives. The beverage disclosed herein serves as a means of providing a high-complete-protein, energy-enhancement and muscle-rejuvenation formulation to individuals who have undergone physical exercise without the use of caffeine, taurine or other potentially harmful chemical additives.

The beverage composition disclosed herein provides high-complete protein, all of the qualitative nutrients found in Low-calorie Lactose-free Skim milk as well as increased immune system response and antioxidant activity for the consumer. The beverage composition also supplies more rapidly absorbed natural forms of calcium, magnesium and potassium without gastric upset and stomach bloating. The disclosure further provides a pleasant vehicle for the consumption of essential nutrients by youth who are "AT RISK" of development of rickets, osteomalacia and other bone diseases.

In another aspect of the disclosure, the beverage composition disclosed herein uses carbon dioxide during processing to reduce the pH of the beverage mixture to assist in the preparation of a uniform solution. Use of carbon dioxide also reduces the development of colonies of bacteria before pasteurization to thereby assist in the extension of shelf life of this agriculturally-based beverage. Flavors such as Saskatoon Berry, Strawberry Kiwi, Cranberry-Apple, Power Berry, Brazilian Chocolate and Cookies N' Crème may be made with uniform nutrition and activity content.

In a yet further aspect of the disclosure, a method of making a beverage composition includes the use of carbon dioxide pre-pasteurization to reduce the pH of the beverage mixture, to assist in the preparation of a uniform solution and to effectively reduce the growth of bacterial colonies in the beverage and reduce the degradation of ingredients. In a still further aspect of the disclosure, nitrogen gas or argon gas are used to de-aerate the beverage mixture prior to pasteurization. These and other aspects of the disclosure will become apparent from a reading of the following detailed description of the disclosure.

DETAILED DESCRIPTION OF THE DISCLOSURE

The beverage composition in its broadest aspect comprises Low-calorie, Lactose-free Skim milk processed to enhance its complete protein content or protein-enriched non-dairy mineral permeate. More particularly, the beverage composition comprises a beverage solution containing in each 295 ml (10 Fl. Oz.) from about 0.1 gm to about 1,000 gm of ultra-filtered and protein-condensed Low-calorie, Lactose-free Skim milk liquid or dry powder. If dry powder is used, it is reconstituted by adding 48 gm powder to 200 ml purified $H_2O$.

The beverage composition further comprises Amelanchier alnifolia purified extract from about 0.5 oz to about 7.0 oz per 295 ml of beverage solution. The Amelanchier alnifolia extract is prepared as follows. One (1) lb. of Amelanchier alnifolia berries are harvested at maturity and are rinsed in a citric acid water rinse. The berries are given a final rinse with Reverse Osmosis ("RO") $H_2O$ set at a temperature of about 38-40° F. The berries are gently crushed and placed in a small tank equipped with a gauge. The tank is sealed and placed in an ice bath. Food-grade $CO_2$ gas is infused into the tank with mild agitation to activate the Abscisic Acid contained in the fruit tissues. The process is continued for a time of about 5 to about 10 minutes until the $CO_2$ level in the tank reaches about 10 Psi on the tank gauge. The tank valves are now opened and the $CO_2$ gas allowed to escape.

After the $CO_2$ is released, the berries are transferred to a stainless-steel container containing about 64 oz of RO purified $H_2O$ to form a RO $H_2O$/berry mixture. Optionally, a portion of this water may be used to rinse the all contents out of the $CO_2$ tank. The temperature of the RO $H_2O$/berry mixture is raised to about 90° F. The mixture is heated with constant agitation for about 30 minutes. At the end of heating, the mixture is rapidly cooled and macerated. At the end of maceration (approximately 15 minutes), the mixture is filtered through a Buon Course Filter Unit (40 micron) and the permeate is collected aseptically.

The beverage composition further comprises a beverage solution containing per 295 ml of solution from about 0.1 gm to about 500 gm crystalline fructose added to the RO $H_2O$/berry mixture. No particular method is needed to add the fructose. The beverage composition further comprises a beverage solution containing per 295 ml from about 0.1 gm to about 1,000 gm of natural vanilla flavor. The vanilla flavor is simply added and mixed into the RO $H_2O$/berry mixture. Lastly, the beverage solution comprises a composition per 295 ml from about 0.1 gm to about 500 gm of natural lemon flavor added and mixed into the RO $H_2O$/berry mixture.

To further enhance the nutritional value of the beverage composition, from about 100 IU to about 5,000 IU per 295 ml beverage solution of Vitamin A Palmitate is added to the beverage composition. Also added to the beverage composition is Vitamin D3 from about 10 IU to about 1,000 IU per 295 ml beverage solution.

The completed beverage composition is pasteurized at 170° F. for about 30 minutes. Purified $H_2O$ is next added to the mixture at a rate of from about 2 parts mixture to 1 part $H_2O$. The final product is now placed in a Zahm Nagel Carbonator and food-grade $CO_2$ gas is bubbled in until a level of about 1.5 volumes is reached.

In another aspect of the disclosure, a method used to prepare the beverage composition involves the following steps. A pre-determined weight of crystalline fructose in powder form (88 g/64 oz of finished product) is first weighed out and placed in a stainless-steel vesicle. Next, 15 oz Coconut water is added to the powder with slow agitation so as not to create a high vortex which could produce foaming and entrapped air to form a mixture. The temperature of the mixture is now raised to about 90° F. while stirring at low speed for ten (10) minutes until complete solution equilibrium is achieved.

Next, about 90.72 gm per 64 oz beverage solution of high-complete-protein, low-calorie, Lactose-free Skim milk powder is added to the mixture with continued low vortex stirring at 90° F. for about ten (10) minutes until complete solution/suspension is achieved. Next, about 16.0 oz per 64 oz of total beverage solution of Amelanchier alnifolia extract, prepared in accordance with the disclosure herein, is added to the mixture with low vortex stirring for about five (5) minutes. $CO_2$ gas is bubbled into the mixture while adding the Amelanchier alnifolia extract to lower the pH of the solution, to replace entrapped air and to lower the bacterial count of the mixture.

Next, from about 0.1 gm to about 50 gm/64 oz of total beverage mixture of natural vanilla flavor is added to the beverage composition with continued stirring. Lastly, from about 0.01 gm to about 10 gm/64 oz total beverage solution of natural mixed fruit flavor is added to the mixture with stirring. The completed mixture is then transferred to a VAT Pasteurizer and the mixture is pasteurized at about 178° F. for thirty (30) minutes with agitation.

To add carbonation to the completed mixture, carbonated distilled $H_2O$ (H 3.0-3.5 vols) is added to the mixture in about a 50-50 ratio with slow agitation. The mixture is chilled rapidly and filled at about 35-38° F. into 10 oz PET bottles which have been de-aerated with $CO_2$, Argon or Nitrogen gas. The filled bottles are stored at about 38° F. and are best used within 72 days.

In a yet further aspect of the disclosure, a beverage composition mixture is prepared by mixing from about forty-eight (48) to about sixty-eight (68) gm of crystalline fructose per 64 oz finished beverage solution with Nature Flavor Powder from about 0.1 gm to about 1,000 gm per 64 oz finished product of Nature Flavor Powder selected from the group consisting of Orange, Brazilian Chocolate, Strawberry, Cranberry, Saskatoon Berry, Leon, mixed fruit or fresh Hops and mixtures thereof. The mixture is added to a stainless-steel container and from about 0.1 oz to about 128 oz of purified $H_2O$ is added to the container and the container temperature is raised to about 90° F. The mixture is mixed until the flavor components are completely dissolved in the mixture.

Next, from about 1.0 gm to about 500 gm of low-calorie Lactose-free Milk powder instantized is added to the mixture with low vortex stirring until a complete solution is achieved. Thereafter, from about 0.1% to about 30% of Apple Pectin AM 800 powder is added to the 90° F. mixed with no vortex agitation. The mixture is next diluted with 2 parts to 1 part water with stirring. The mixture is pasteurized at about 180° F. for 30 minutes with no vortex agitation. Next, the mixture is cooled to room temperature and placed in a Zahm Nagel Tank. The tank is placed in an ice bath to bring the temperature of the mixture in the tank down to about 33-35° F.

To add carbonation, $CO_2$ gas is infused into the tank with constant tank agitation until a constant pressure of about 10 psi is maintained on the tan gauge. The product is then bottled into shelf-stable glass or plastic bottles while maintaining the temperature of the mixture at about 33-35°. After bottling, the bottles are stored at room temperature (79-71° F.) for a maximum of nine (9) months from the date of bottling.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patent is:

1. A beverage composition solution comprising:
    from about 0.1 gm to about 1,000 gm of ultra-filtered and protein-condensed low-calorie, lactose-free skim milk per 295 ml of beverage composition solution; and an Amelanchier ainifolia extract is prepared by: rinsing Amelanchier ainifolia berries in a citric acid water rinse followed by a final rinse with Reverse Osmosis $H_2O$ at a temperature of about 38-40° degrees F., wherein the rinsed Amelanchier ainifolia berries are placed in a sealed-tank ice bath, and wherein $CO_2$ is infused into the sealed tank with agitation to activate the Abscisic Acid contained in the Amelanchier ainifolia berries, and wherein the $CO2_2$ is infused from about 5 to about 10 minutes until the $CO_2$ level in the tank reaches about 10 psi, and wherein the $CO_2$ is released from the tank and the Amelanchier ainifolia berries are placed in a stainless-steel container containing about 64 oz of RO water is purified to form a RO $H_2O$/berry mixture, and wherein the RO $H_2O$ berry mixture temperature is raised to about 90° F. and wherein the RO $H_2O$/berry mixture is heated with constant agitation for about 30 minutes, and wherein the composition solution of RO $H_2O$ berry mixture is cooled and macerated, and wherein the beverage composition with the RO $H_2O$/berry mixture is filtered and the permeate collected aseptically;
    from about 0.5 oz to about 7.0 oz Amelanchier alnifolia extract per 295 ml of beverage composition solution added to the skim milk to form a mixture;
    about 65 oz of RO purified $H_2O$ added to the mixture;
    from about 0.1 gm to about 500 gm crystalline fructose added to the mixture;
    from about 0.1 gm to about 1,000 gm natural vanilla flavor added to the mixture;
    from about 0.1 gm to about 500 gm natural lemon flavor added to the mixture; and,
    $CO_2$ infused into the mixture with constant agitation until a pressure of about 10 psi is reached for a minimum of about 30 minutes.

2. The beverage composition solution of claim 1 further comprising from about 10 IU to about 1,000 IU vitamin D3 per 295 ml of beverage solution.

3. The beverage composition solution of claim 1 wherein the protein-condensed low-calorie, lactose-free skim milk is derived from about 48 gm dry powder mixed with about 200 ml purified $H_2O$.

4. The beverage composition of claim 1 wherein the $CO_2$ gas is bubbled into the mixture while adding the Amelanchier alnifolia extract to lower the pH of the solution, replace entrapped air and to lower the bacterial count of the mixture.

* * * * *